E. TYDEN.
SEAL LOCKING DEVICE.
APPLICATION FILED FEB. 26, 1915.
1,155,769.
Patented Oct. 5, 1915.
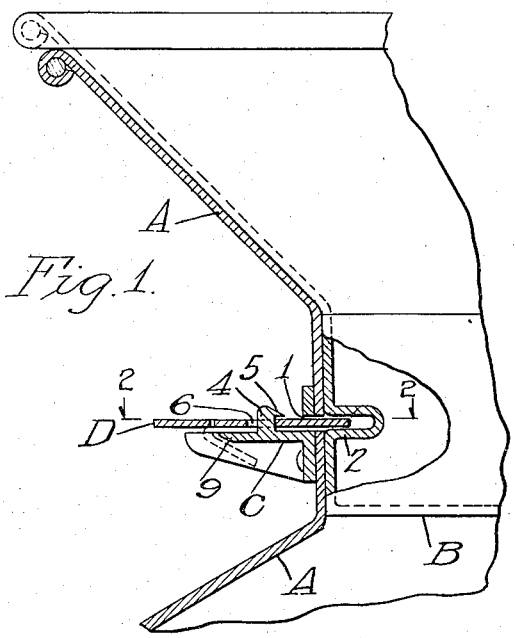
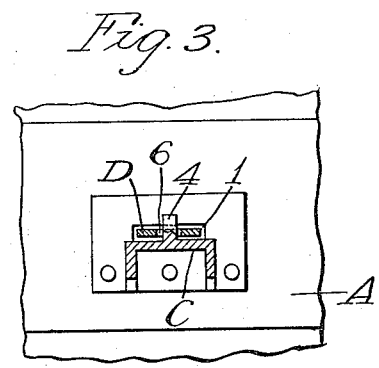
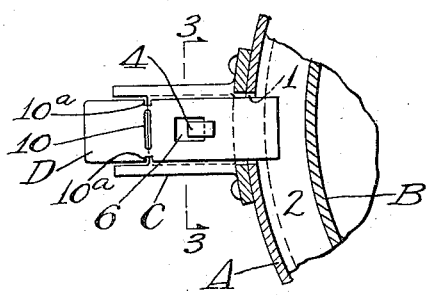
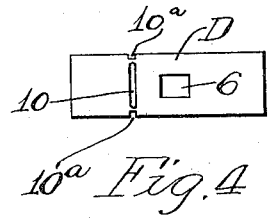
Witnesses:
Inventor:
Emil Tyden
by Burton & Burton
his attys

UNITED STATES PATENT OFFICE.

EMIL TYDEN, OF EVANSTON, ILLINOIS.

SEAL-LOCKING DEVICE.

1,155,769.   Specification of Letters Patent.   Patented Oct. 5, 1915.

Application filed February 26, 1915. Serial No. 10,814.

*To all whom it may concern:*

Be it known that I, EMIL TYDEN, a citizen of the United States, and resident of Evanston, in the county of Cook and State of Illinois, have invented new and useful Improvements in Seal-Locking Devices, of which the following is a specification, reference being had to the accompanying drawings, forming a part thereof.

This application is directed to the specific form of seal-locking device which is shown in my Patent No. 1,115,620, dated November 3, 1914, as a modification of the general type therein claimed, this specific modification being not claimable in that patent.

The purpose of this invention is to provide an improved seal locking device, particularly adapted for locking and sealing such articles as cans and the like, having interlapping, overlapping or telescoping members which are connected together in the locking.

It consists in the elements and features of construction shown and described as indicated in the claims.

In the drawings: Figure 1 is a radial section of a portion of a can having a seal-locking device embodying this invention. Fig. 2 is a section at the line 2—2, on Fig. 1. Fig. 3 is a section at the line 3—3, on Fig. 2. Fig. 4 is a plan view of the seal bolt device employed in this construction.

In the drawings A represents the body of the can and B the cover, and these two elements may stand for any two members which are to be secured together by the seal-locking device described.

The seal-locking device consists of a mount, C, secured upon the outer surface of the outer member which in this case is the can body, having an aperture, 1, through which the seal bolt is thrust for engaging any suitable shoulder, 2, on the other member, in this case the cover of the can. The mount is in the form of a bracket riveted to the outer surface of the can having its aperture, 1, registering with an aperture through the sheet metal of the can so that the seal bolt thrusts through the aperture of the mount and penetrates also the aperture of the can body to reach the shoulder to the cover. The mount, C, has upon the surface along which the seal bolt extends when in locking position an abutment, 4, which faces the aperture, 1, and which is hooked in form, that is, having a projection, 5, offset from the surface of the mount and extending toward the aperture.

The seal bolt, D, is a strip of metal substantially parallel-sided and having one end adapted to be thrust through the aperture, 1, for locking. A distance back from that end the seal bolt has an aperture, 6, adapting it to be passed onto or into engagement with the abutment, 4, after the engaging end of the bolt had been thrust through the aperture, 1, a distance more than sufficient for its operative engagement with the shoulder, 2, and less than the overhang of the hook projection, 5, of the abutment, 4, so that the seal bolt having been thrust through the aperture, 1, and engaged by means of its aperture, 6, with the abutment, 4, may be drawn back so as to have the margin of the aperture, 6, at one end engaged under the overhang or hook, 5, of the abutment, 4, preventing the seal bolt from being moved laterally away from its seat on the mount. It will be seen that since while thus engaged means can be provided for preventing the seal bolt from being thrust longitudinally inward again to the position at which it was entered into engagement with the abutment, 4, its disengagement from the hook or overhang of said abutment would be prevented and consequently its removal from locked position would be prevented. This is effected by folding the seal bolt over the ends of the abutment and thus engaging it with that end against longitudinal movement inward, and for further security the mount has an abutment or projection, 9, extending from the opposite side thereof from that at which the abutment, 4, projects, and near the outer extremity of said mount, and the seal bolt has an aperture, 10, positioned for becoming engaged with the abutment, 9, when the end portion of the seal bolt is folded up as described over the end of the mount and back upon the opposite side thereof, as seen in Fig. 1. The seal bolt is weakened not only by the aperture, 10, but preferably further by notches, 10ª, 10ª, extending from the inner end of said aperture out toward the lateral edges of the seal bolt at the line at which it is folded over the end of the mount as described, and the thickness of the metal of which the seal bolt is formed and its character is such that having been thus folded at this line to engage the aperture, 10, with the abutment, 9, any attempt to straighten it back into its original position as will be necessary in order that it might be moved longitudinally for disengagement of the aperture, 6, from the overhang of the the abutment, 4, will cause the seal to break at the folded line.

It will be observed that in effect the aperture, 6, is effective for the purpose which it serves, as above described, by the virtue of affording three shoulders, consisting of its side toward the can which is engaged by the hook, 5, and the two sides transverse to that side, which latter two sides constitute shoulders which if no other means for the purpose were present would prevent lateral edgewise movement of the seal by which it might escape from under the overhang of the hook, 5. That is to say, the fourth side of the aperture, 6, adds nothing to the function of the aperture, and the aperture is to be considered substantially as involving its three sides constituting three shoulders for stopping the seal against movement in three directions.

I claim:

1. A flat seal bolt and a mount for the same having an aperture into which the seal bolt is thrust for locking, the mount having a seal slide-way leading to the said aperture, and a part which overhangs said slide-way, the seal-bolt being adapted to enter under such over-hanging part by withdrawal for a distance along its path of inthrust less than the depth of locking engagement effected by such inthrust, and being weakened for folding across the mount at such withdrawn position to prevent its subsequent inthrust, and adapted to break at said weakened line upon being straightened back into line with the path of inthrust.

2. A flat seal bolt and a mount for the same, having an aperture into which the seal bolt is thrust for locking and a slideway for the inthrusting movement of the seal bolt, said slideway having a projection which extends through the path of the seal bolt and also overhangs said path, the seal bolt having an aperture which admits said projection at the extreme inthrust position of the seal bolt, the aperture being adapted to permit the retraction of the seal bolt for a portion of the distance of its inthrust to engage the margin of the aperture under the overhang of the projection, the seal bolt being weakened for folding at a line positioned for causing the folded portion to engage a portion of the mount against inthrust of the seal bolt, and adapted to break at said line of folding upon being folded back to normal position.

3. A flat seal bolt and a mount for the same, having an aperture into which the seal bolt is thrust for locking, the mount having an abutment which projects through the plane of the seal bolt and has an overhang to engage the latter, the seal bolt being cut away to admit the abutment through it and to form a shoulder for stopping withdrawal movement of the seal bolt, the inthrust of the latter for bringing its cut away part to the position for admitting the abutment being in excess of the amount required for locking, so as to permit a partial withdrawal without unlocking, the overhang being positioned for engaging the seal bolt upon such partial withdrawal, the seal bolt being weakened for folding at a line positioned so as to cause the folded portion of the seal bolt to engage a portion of the mount, the inthrust movement of the seal bolt, and adapted to break upon being straightened back to its original position.

4. A flat seal bolt and a mount for the same, having an aperture through which one end of the bolt is adapted to be thrust for engagement, the bolt being cut away between its ends to form three shoulders one facing away from the inthrust end and the other two facing laterally in opposite directions, the mount being formed for being engaged by all three shoulders by flat-wise movement of the bolt when at inthrust position, and the bolt being weakened for folding to engage the outer end of the mount at that position, and for breaking when straightened back far enough for flatwise movement to disengage its shoulder.

In testimony whereof I have hereunto set my hand at Chicago, Illinois, this 8th day of February, 1915.

EMIL TYDEN.

Witnesses:
 EDNA M. MACINTOSH,
 LUCY I. STONE.

Copies of this patent may be obtained for five cents each, by addressing the "Commissioner of Patents, Washington, D. C."